United States Patent [19]
Hogg

[11] Patent Number: 5,466,083
[45] Date of Patent: Nov. 14, 1995

[54] ELECTRICALLY OPERATED MOTORIZED TURNBUCKLE

[76] Inventor: John M. Hogg, 122 King William, San Antonio, Tex. 78204

[21] Appl. No.: 342,359

[22] Filed: Nov. 18, 1994

Related U.S. Application Data

[63] Continuation-in-part of Ser. No. 134,845, Oct. 12, 1993.
[51] Int. Cl.[6] ........................................ F16B 7/06
[52] U.S. Cl. ..................... 403/46; 403/45; 403/43
[58] Field of Search ..................... 403/43–46, 48; 74/586, 584; 310/201; 188/74

[56] References Cited

U.S. PATENT DOCUMENTS

| | | | |
|---|---|---|---|
| 264,648 | 9/1882 | Edison | 310/201 |
| 2,579,305 | 12/1951 | Cushman | 188/74 X |
| 2,599,795 | 6/1952 | White | 188/74 |
| 2,703,723 | 3/1955 | Hess | 403/46 |
| 3,803,926 | 4/1974 | Winter | 403/43 X |
| 3,837,316 | 9/1974 | Stratienko et al. | 403/45 X |
| 4,515,251 | 5/1985 | Wruk | 188/74 X |
| 4,583,421 | 4/1986 | Rose | 74/586 |
| 4,885,494 | 12/1989 | Higashi | 310/201 X |
| 4,973,185 | 11/1990 | Thaller | 403/43 X |
| 5,203,374 | 4/1993 | Smith, III | 285/106 X |

*Primary Examiner*—Anthony Knight

[57] ABSTRACT

This patent is basically an Engineering design of a means to vary the length of a rod of two parts that are coupled together by an electrically operated motorized turnbuckle which can be activated remotely when it is difficult or impossible to access directly. This is accomplished by holding a wand that induces positive or negative pulses to the electrically operated motorized turnbuckle according to the direction of rotation desired for the electrically operated motorized turnbuckle to turn.

18 Claims, 1 Drawing Sheet

ELECTRICALLY OPERATED MOTORIZED TURNBUCKLE

This application is a continuation-in-part of Ser. No. 08/134,845, filed Oct. 12, 1993.

TECHNICAL FIELD

This invention pertains to electrical engineering of a means to remotely control the direction and rotation of an electrically operated motorized turnbuckle.

BACKGROUND OF THE ART

Specific Prior Art problems are summed up as difficult to impossible to access for adjustment of some motorized turnbuckles.

SUMMARY OF THE INVENTION

This invention of an electrically operated motorized turnbuckle will enable the activation for adjustment of a turnbuckle that is difficult, or impossible, to access in order to make adjustments by normal means.

BRIEF DESCRIPTION OF THE DRAWINGS

FIG. number 1 is a detailed drawing of a turnbuckle designed to operate using this means of control.

DESCRIPTION OF THE PREFERRED EMBODIMENTS

Figure 1:
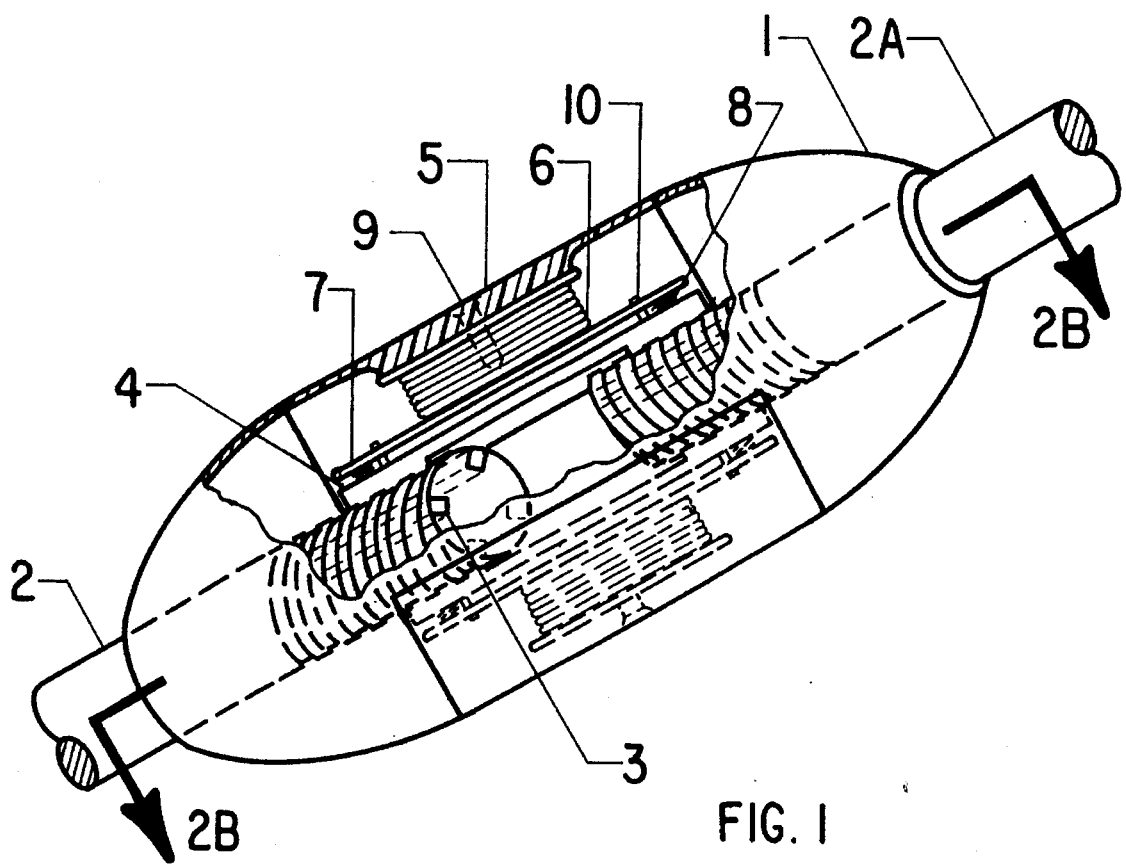
In FIG. 1 number 1 is the metal turnbuckle. Numbers 2 and 2A are the parts of the shaft to be adjusted. Numbers 3 are the magnets imbedded in the shafts. Numbers 4 are the brakes. Numbers 5 are the plastics that hold the magnetic poles and electrically operated brakes in position. Numbers 6 are the coils of the poles. Numbers 7 are the metal poles. Numbers 8 are the springs that engage the brakes. Numbers 9 are the mounting screws for the metal poles. Numbers 10 are guide pins for the brakes.
Figure 2:
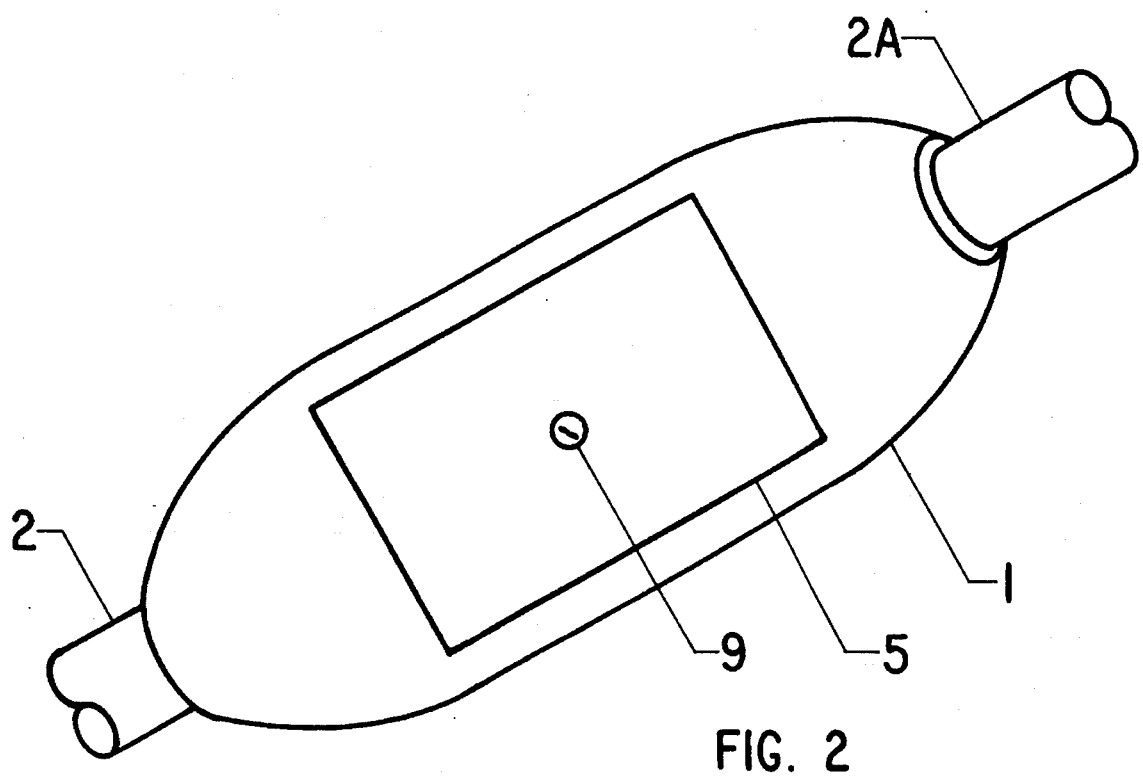
FIG. 2 is rotated 90 degrees around 2B—2B of FIG. 1.

Electrically operated motorized turnbuckles can be used when it is necessary to adjust the length of a shaft especially where it is difficult or impossible to access the turnbuckle. In which case the turnbuckle could be wired as an armature and permanent magnets or coils imbedded into the threaded shafts so that an induced voltage could be applied to turn the turnbuckle. Because of the means used to control the turnbuckle motor it should be built for DC operation using positive or negative pulses, according to the desired direction of rotation, for the necessary turning torque from AC voltage. If it is not possible to make direct electrical contact with this motor it can be activated by an induction coil held flat over the motorized turnbuckle which supplies rectified positive pulses of the voltage applied to this induction coil, which determines one direction of rotation, until the desired correction is made. If the induction coil is supplied with negative pulses of the voltage applied to this induction coil the turnbuckle will rotate in the opposite direction. The higher frequency of 400 cycles per second is recommended to furnish a steadier, higher torque to the motor. Armature brakes can be spring loaded to press on the threaded shafts. When the induced voltage is applied these brakes are drawn into the coils allowing the turnbuckle to turn.

I claim:

1. A turnbuckle connection comprising:

a first shaft having a threaded end portion with first threads of a first type;

a second shaft having a threaded end portion with second threads of a different type than said first threads;

a turnbuckle having a first end threaded to receive said first threads and a second end threaded to receive said second threads, the difference in said first and second threads being such as to cause the ends of said shafts to be drawn closer together when said turnbuckle is rotated in a first direction and pushed further apart upon rotation of said turnbuckle in a second direction; and said turnbuckle further including remotely controlled means for causing said turnbuckle to rotate relative to said shafts so that the distance between said shaft ends can be adjusted.

2. The turnbuckle connection as recited in claim 1 further comprising a retractable brake contained within said turnbuckle for engaging said first and second shafts to prevent movement of said shafts.

3. The turnbuckle connection as recited in claim 2 wherein said brake is spring biased into engagement with said shafts.

4. The turnbuckle connection as recited in claim 3 wherein said brake is retracted out of engagement with said shafts by said means that causes said turnbuckle to rotate.

5. The turnbuckle connection as recited in claim 4 wherein said shafts include magnets imbedded within said threaded end portions.

6. The turnbuckle connection as recited in claim 5 wherein said turnbuckle includes at least two coils and said means that causes said turnbuckle to rotate is a voltage induced in said coils.

7. The turnbuckle connection as recited in claim 6 wherein said first thread is of a first hand and said second thread is of a second different hand.

8. The turnbuckle connection as recited in claim 1 wherein said turnbuckle includes at least two coils and said means that causes said turnbuckle to rotate includes a voltage induced in said coils.

9. The turnbuckle connection as recited in claim 8 wherein the frequency of the induced voltage is approximately 400 cycles per second.

10. The turnbuckle connection as recited in claim 9 wherein said shafts include magnets imbedded within said threaded end portions.

11. The turnbuckle connection as recited in claim 10 wherein said first tread is of a first hand and said second thread is of a second different hand.

12. The turnbuckle connection as recited in claim 1 wherein said shafts include magnets imbedded within said threaded end portions.

13. The turnbuckle connection as recited in claim 1 wherein said first thread is of a first hand and said second thread is of a second different hand.

14. A turnbuckle comprising:

a hollow cylindrical member having a first end threaded with threads of a first type for connection to a first threaded shaft and a second end threaded with second threads of different type than said first type for connection to a second threaded shaft, the difference in the threads being such that the distance between the ends of the shafts can be adjusted upon rotation of said turnbuckle;

at least two coils disposed within said hollow cylindrical member, said coils causing said hollow cylindrical member to rotate when said threaded ends are attached to the threaded shafts and said hollow cylindrical member is subjected to a magnetic field created by a pulsating voltage applied to an induction device positioned adjacent to said hollow cylindrical member.

15. The turnbuckle as recited in claim 14 further comprising a spring biased brake attached to each said coil such that upon energizing the induction device said brakes are caused to retract.

16. The turnbuckle as recited in claim 15 wherein said brakes include guide pins for guiding the brakes during retraction.

17. The turnbuckle as recited in claim 16 wherein said first thread is of a first hand and said second thread is of a second different hand.

18. The turnbuckle as recited in claim 14 wherein said first thread is of a first hand and said second thread is of a second different hand.

* * * * *